United States Patent [19]
Matsumoto

[11] Patent Number: 5,820,157
[45] Date of Patent: Oct. 13, 1998

[54] AIR BAG MOUNTING IN A VEHICLE

[75] Inventor: Tadahiro Matsumoto, Fujisawa, Japan

[73] Assignee: Isuzu Motors Limited, Tokyo, Japan

[21] Appl. No.: 679,150

[22] Filed: Jul. 12, 1996

[30] Foreign Application Priority Data

Jul. 12, 1995 [JP] Japan .................................. 7-176124

[51] Int. Cl.⁶ .................................................. B60R 21/16
[52] U.S. Cl. ...................................... 280/728.2; 280/732
[58] Field of Search ................................. 280/728.2, 732

[56] References Cited

U.S. PATENT DOCUMENTS 5,403,033  4/1995  Koma ...................................... 280/732
5,489,116  2/1996  Boag ....................................... 280/732

Primary Examiner—Paul N. Dickson
Attorney, Agent, or Firm—Antonelli, Terry, Stout & Kraus, LLP

[57] ABSTRACT

An instrument panel 1 has opening 2 formed therein for accommodating an air bag mounting for a vehicle. The vehicle air bag, and a structure element 4 is provided in the inside of the opening. A mount portion 9 of an air bag unit 6 is fixed to a bracket 5 of the structure element 4 with bolts 10. The air bag unit 6 has mount portions 8 at its opposite sides, at which the air bag unit 6 is fixed with bolts 18 to brackets 13 mounted at opposite sides of the opening 2. The brackets 13 are made of steel plate, and have upper and lower ends connected to the instrument panel with screws 14 via reinforcing bosses 15 or reinforcing elements 12.

3 Claims, 4 Drawing Sheets

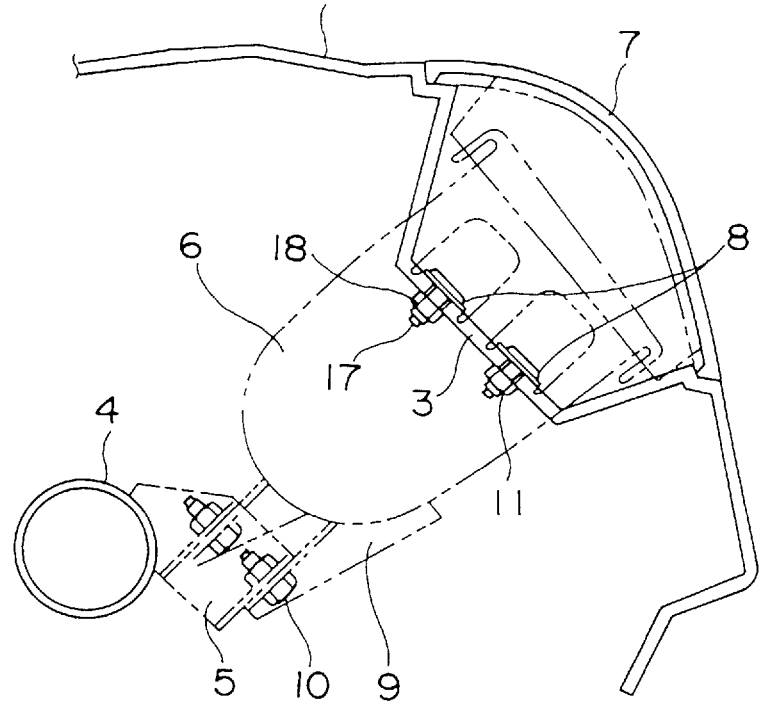

AIR BAG MOUNTING IN A VEHICLE

BACKGROUND OF THE INVENTION

1. Field of the Invention

This invention relates to an air bag attached to the instrument panel in front of the front passenger seat of a vehicle.

2. Related Art

FIG. 3 is a perspective view of a mounting structure of a conventional air bag equipment, and FIG. 4 is a cross-sectional view taken along line 4—4 of FIG. 3.

An instrument panel 1 of a vehicle has an opening 2 formed therein for accommodating an air bag, and a structure element 4 is provided inside of the opening 2.

An air bag unit 6 includes a casing containing an air bag an, inflator and related elements and is closed by a door 7. The air bag unit 6 has fixture means 8 at opposite sides of the casing, and another fixture means 9 at its lower portion for connection to the structure element 4.

The instrument panel 1 also has formed a resin-made fixture means 3 which is integrally molded on opposite inner sides of the opening 2. The fixture means 8 of the air bag unit 6 is connected to the resin-made fixture means 3 by means of bolts 17 and nuts 18. The lower fixture means 9 of the air bag unit is fixed to a bracket 5 associated with the structure element 4 by means of bolts 10.

This type of mounting structure of a front passenger seat air bag is disclosed in Japanese Utility Model Laid-Open No. 1-81156 (1989).

When the air bag expands, a reactive force causes the air bag unit to rotate about the lower fixture means. As a result, a stress concentrated at the junction between the air bag unit and the instrument panel may cause a crack in the instrument panel.

If the instrument panel breaks upon expansion of the air bag due to a small collision, the repair cost of the vehicle with the air bag is greater for the user than that of a vehicle with no air bag.

SUMMARY OF THE INVENTION

In order to solve the problems involved in the conventional systems, the invention prevents a crack of the instrument panel due to only a reaction force upon expansion of the air bag, while satisfying both good fitting between the door of the air bag unit and the opening of the instrument panel and easy mounting of the air bag unit to the vehicle.

The air bag unit used in the air bag mounting of the present invention includes fixture means formed at the bottom of a casing and fixture means formed at opposite sides of the casing. A structure element is provided in the opening in an instrument panel for accommodating the air bag. The fixture means at the bottom of the casing is fixed to the structure element of the vehicle. The fixture means at opposite sides of the casing are configured to be fixed to flat shaped steel brackets provided at opposite inner sides of the opening of the instrument panel.

BRIEF DESCRIPTION OF THE DRAWINGS

FIG. 4 is a cross-sectional view taken along line 4—4 of FIG. 3.

DESCRIPTION OF THE PREFERRED EMBODIMENT

Figure 1:
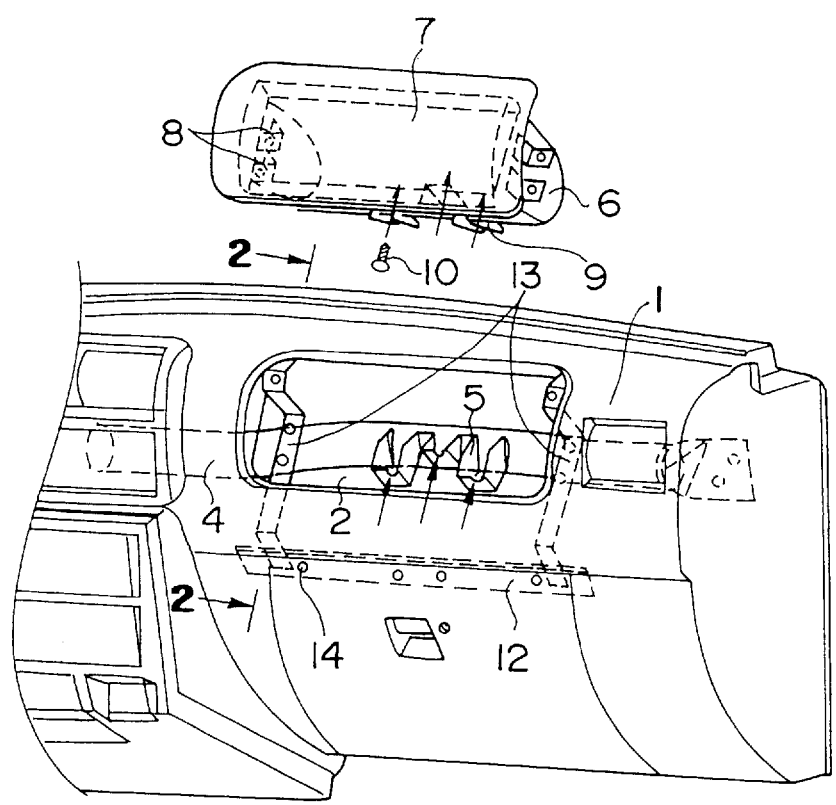
FIG. 1 is a perspective view of a mounting structure of an air bag mounting according to the invention.
Figure 2:
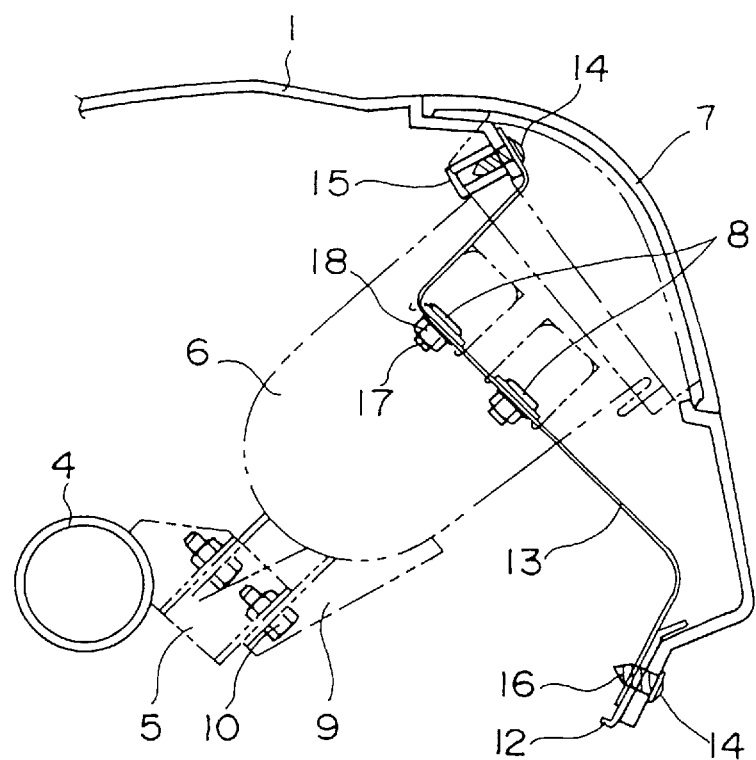
FIG. 2 is a cross-sectional view taken along line 2—2 of FIG. 1.
Figure 3:
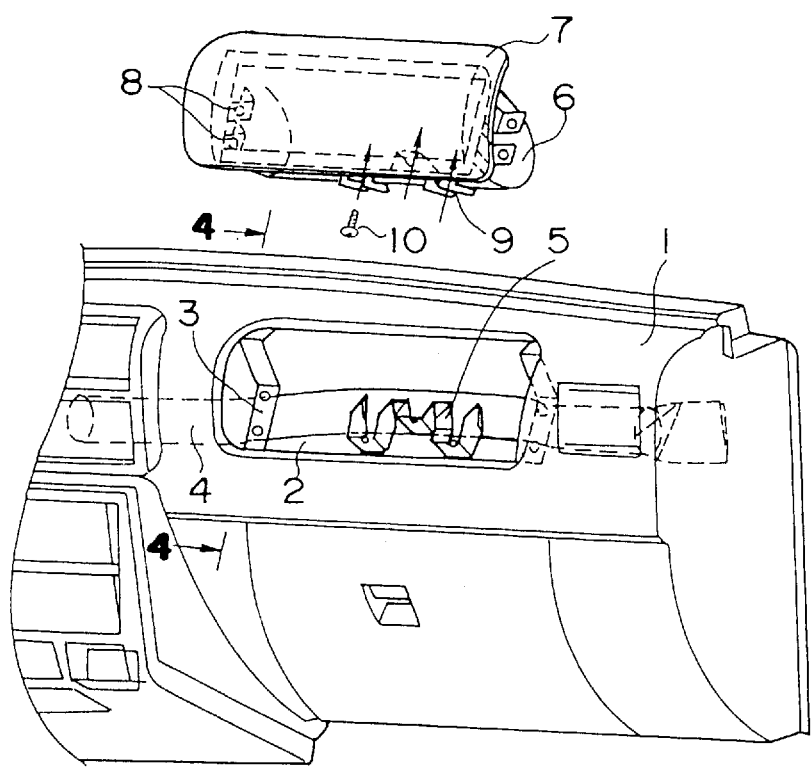
FIG. 3 is a perspective view of a mounting structure of a conventional air bag mounting.

A preferred embodiment of the invention is described below with reference to FIG. 1 and FIG. 2.

An instrument panel 1 of a vehicle has an opening 2 formed therein for accommodating an air bag, and a structure element 4 is provided inside of the opening 2.

An air bag unit 6 includes a casing containing the air bag an, inflator and other related elements, and is closed by a door 7. The air bag unit 6 also has formed fixture portions 8 at opposite sides of the casing, and another fixture portion 9 at its lower portion for connection to the structure element 4.

Steel brackets 13 are located at opposite sides of the air bag opening 2 of the instrument panel 1. Each bracket 13 includes a burring bore 16 at its lower end in which a screw 14 is received via a reinforcing element 12 to join the bracket 13 to the instrument panel 1. The upper end of the bracket 13 is connected to a resin boss 15 extending from the instrument panel 1 by means of a screw 14. The bracket 13 is a flat shaped steel plate of a thickness and shape to be easily deformable when a force is applied. Fixed to middle portions of the brackets 13 are fixture portions 8 of the air bag unit 6 by using stud bolts 17 and nuts 18. The structure element 4, commonly used as a steering support member, has an air bag fixture bracket 5 which rigidly fixes the lower fixture portion 9 of the air bag unit with a fixture bolt 10.

In the mounting described above, when the air bag expands, a reactive force causes a rotating movement of the air bag unit about the lower fixture portion, and the steel brackets 13 deform so as to absorb the reaction force. As a result, cracks or other breakage does not occur in the resin-made instrument panel 1.

According to the construction of the invention, a crack of the instrument panel only by due a reaction force upon expansion of the air bag can be prevented, while both good fitting between the door of the air bag unit and the opening of the instrument panel and easy mounting of the air bag unit in a vehicle are achieved.

The above advantage minimizes the cost for repairing the air bag unit and/or related parts after a small collision of the vehicle.

Also prevented is decrease in performance of the air bag due to a breakage of the air bag caused by cracks in the instrument panel.

Since cracks in the instrument panel can be prevented, passengers in the vehicle will not be injured by scattered pieces of resin.

What is claimed is:

1. An air bag mounting for mounting an air bag in an opening in an instrument panel of a vehicle in front of a front passenger seat of the vehicle, said air bag mounting comprising:

an air bag unit including a casing and a door, a bottom fixture provided at a bottom portion of said casing, a pair of brackets, and side fixtures provided on opposite sides of said casing and substantially below a bottom surface of said door, said bottom fixture being adapted to be fixed to a structure element of said vehicle, each of said brackets having a first end, adapted to be mounted to a first location on the vehicle instrument panel, and a second end, adapted to be mounted to a second location on the vehicle instrument panel, the first and second locations being at inner opposite sides of the instrument panel opening to position said brackets beneath the instrument panel opening, said side fixtures being fixed to said brackets, each bracket having a length greater than the distance from the first location to the second location to provide a first deformable portion between said side fixtures and said first end and a second deformable portion between said side fixtures and said second end.

2. An air bag mounting according to claim 1, wherein each of said brackets has a furring hole at each of said first end and said second end, permitting mounting of said brackets to the instrument panel by means of screws.

3. An air bag mounting according to claim 1, wherein each of said brackets is formed of a flat steel plate.

* * * * *